United States Patent Office 3,740,390
Patented June 19, 1973

---

3,740,390
CARDENOLIDE RHAMNOSIDES
Joachim Heider, Warthausen-Oberhofen, and Josef Nickl and Wolfgang Eberlein, Biberach an der Riss, Germany, Walter Kobinger, Vienna, Austria, and Gerhard Dahms, Biberach an der Riss, Germany, assignors to Boehringer Ingelheim GmbH, Ingelheim am Rhein, Germany
No Drawing. Filed Jan. 8, 1971, Ser. No. 105,121
Claims priority, application Germany, Jan. 14, 1970,
P 20 01 364.3
Int. Cl. C07c 173/00
U.S. Cl. 260—210.5         5 Claims

ABSTRACT OF THE DISCLOSURE

Compounds of the formula

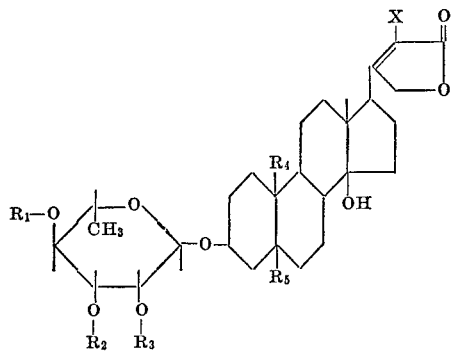

wherein
X is fluorine or methyl,
$R_1$ is hydrogen or acetyl,
$R_2$ and $R_3$ are each hydrogen or acetyl or, together with each other O-isopropylidene,
$R_5$ is hydrogen or hydroxyl, and
$R_4$ is methyl when $R_5$ is hydrogen; or formyl or hydroxymethyl when $R_5$ is hydroxyl;
the compounds are useful as cardiotonics with a positive inotropic action.

---

This invention relates to novel cardenolide rhamnosides and methods of preparing the same.

More particularly, the present invention relates to novel cardenolide rhamnosides of the formula

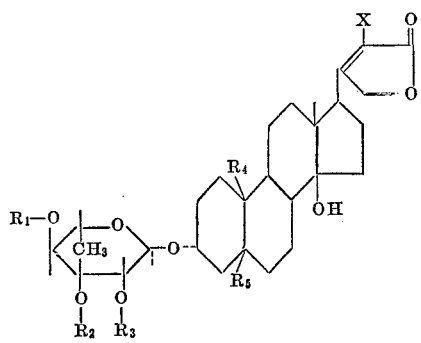

wherein
X is fluorine or methyl,
$R_1$ is hydrogen or acetyl,
$R_2$ and $R_3$ are each hydrogen or acetyl or, together with each other O-isopropylidene,
$R_5$ is hydrogen or hydroxyl, and
$R_4$ is methyl when $R_5$ is hydrogen; or formyl or hydroxymethyl when $R_5$ is hydroxyl.

The compounds according to the present invention may be prepared by the following methods:

METHOD A

For the preparation of a compound of the Formula I wherein $R_4$ is methyl or hydroxymethyl, by intramolecular cyclization of a steroid ester of the formula

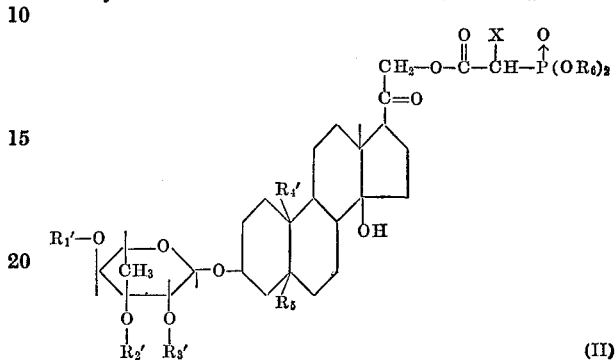

wherein
X has the same meanings as in Formula I,
$R_6$ is lower alkyl,
$R_1'$, $R_2'$ and $R_3'$ are each a readily removable protective group, such as acetyl,
$R_5$ has the same meanings as in Formula I, and
$R_4'$ is methyl when $R_5$ is hydrogen, or hydroxymethyl protected by a readily removable protective group, such as acetyl, when $R_5$ is hydroxyl, in the presence of a base, and wherever necessary subsequent removal of the protective groups by conventional methods.

The cyclization is carried out in the presence of a base, such as an alkali metal alcoholate, alkali metal hydride, alkali metal amide, alkali metal hydroxide or alkali metal carbonate, advantageously in an inert organic solvent, such as dimethyl glycol ether, and at a temperature between —40 and +50° C., preferably 0 to 20° C.

The protective groups may, in addition to acetyl, also be other conventional protective groups of hydroxyl, such as trimethylsilyl, tetrahydropyranyl or phosphonoacyl. The subsequent removal of acetyl or phosphonoacyl protective groups may be effected, for example, by mild alkaline or acid hydrolysis, and the removal of trimethylsilyl or tetrahydropyranyl protective groups by treatment with dilute acids.

METHOD B

For the preparation of a compound of the Formula I wherein $R_4$ is methyl or formyl, by reacting a steroid of the formula

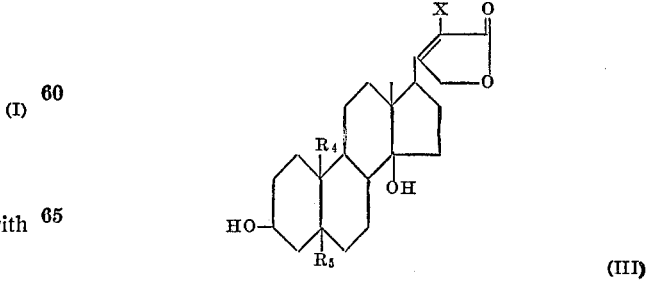

wherein X and $R_5$ have the same meanings as in Formula I and $R_4$ is methyl when $R_5$ is hydrogen, or formyl when $R_5$ is hydroxyl, with a tri-O-acyl-α-L-rhamnopyranosyl halide of the formula

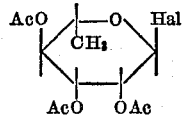
(IV)

wherein Ac is acyl, such as acetyl or benzoyl, and Hal is halogen, and, if necessary, subsequently splitting off the acyl groups by conventional methods.

The reaction is preferably performed in the presence of an inert organic solvent, such as ethylene chloride, and advantageously in the presence of a heavy metal salt, such as mercury-II-cyanide, or of a tertiary organic base, and preferably at a temperature between 0 and 50° C.

The optional subsequent removal of the protective acyl substituents is preferably effected by means of mild alkaline hydrolysis, for instance with potassium carbonate, in aqueous ethanolic solution at temperatures up to the boiling point of the solvent medium.

In those instances where method A or B yields a compound of the Formula I wherein $R_2$ and $R_3$ are both hydrogen, this compound may, if desired, be converted into the corresponding cardenolide rhamnoside of the Formula I wherein $R_2$ and $R_3$, together with each other, are O-isopropylidene, by treatment with a dehydrating agent, such as p-toluenesulfonic acid or anhydrous copper-II-sulfate, in the presence of acetone and/or 2,2-dimethoxy-propane.

Furthermore, a compound of the Formula I wherein $R_1$ is hydrogen may, if desired, be converted into the corresponding acyl derivative by reaction with a reactive acid derivative, such as acetic acid anhydride.

Finally, a compound of the Formula I wherein $R_4$ is formyl, may be converted into the corresponding hydroxymethyl compound by reduction with lithium tri-tert.-butoxy aluminum hydride, for example, at 0° C. in the presence of an inert organic solvent, such as tetrahydrofuran.

The starting compounds embraced by Formulas II and III are also new; they may, however, be prepared by methods involving well known chemical principles. For instance, a compound of the Formula II may be prepared by reacting an α-ketol of the formula

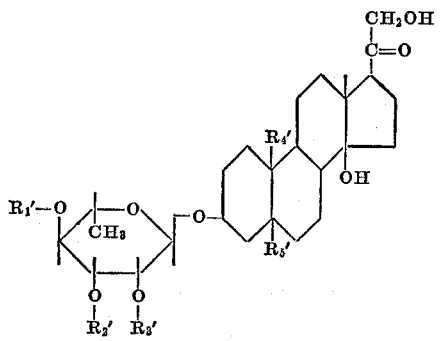
(V)

wherein $R_1'$, $R_2'$, $R_3'$, $R_4'$ and $R_5'$ have the same meanings as in Formula II, with a phosphonic acid compound of the formula

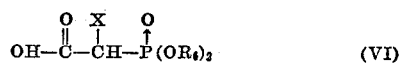
(VI)

wherein X has the same meanings as Formula I and $R_6$ has the same meanings as in Formula II, and, if necessary, subsequently removing the protective groups by conventional methods.

Likewise, a compound of the Formula III, except one wherein $R_4$ is formyl, may be prepared by reacting an α-keto of the formula

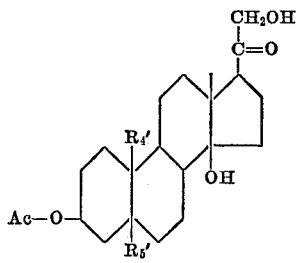
(VII)

wherein
Ac has the same meanings as in Formula IV, and $R_4'$ and $R_5'$ have the same meanings as in Formula II,
with a phosphonic acid compound of the Formula VI under dehydrating conditions, and thereafter removing the protective groups.

In either case, the esterification reaction between the phosphonic acid Compound VI and the α-ketols V and VII, respectively, is advantageously performed in an inert organic solvent, such as benzene or glycol dimethyl ether, in the presence of a dehydrating agent, such as dicyclohexyl carbodiimide, at a temperature between −20 and +50° C. The removal of the protective groups is advantageously effected by treatment with methanolic ammonia.

A compound of the Formula III wherein $R_4$ is formyl is prepared by oxidation of a steroid of the formula

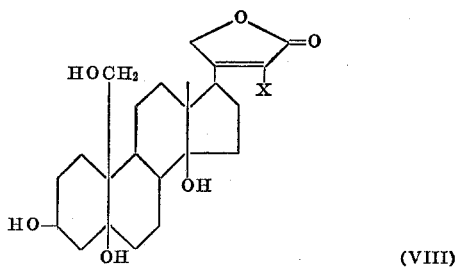
(VIII)

wherein X has the same meanings as in Formula I, with chromium trioxide in the presence of pyridine.

The α-ketols of the Formulas V and VII may be prepared by methods described in the literature, such as that of K. Mayer and T. Reichstein, Helv. Chim. Acta 30, 1508 (1947).

Most of the phosphonic acid compounds embraced by Formula VI are described in the literature, and those which are not may be prepared by mild equimolar alkaline hydrolysis of the corresponding phosphonic acid ester, followed by acidification with a mineral acid and extraction with an organic solvent.

The following examples further illustrate the present invention and will enable others skilled in the art to understand it more completely. It should be understood, however, that the invention is not limited solely to the particular examples given below.

EXAMPLE 1

Preparation of 22-fluoro-evomonoside by method A (a) 3β - (2′,3′,4′ - O-triacetyl)-α-L-rhamnopyranosyl-14β,21-dihydroxy - 21 - (2″ - diethylphosphono-2″-fluoroacetyl)-20-oxo-5β-pregnane.—4.8 gm. (7.8 millimols) of 3β - (2′,3′,4′ - O-triacetyl-α-L-rhamnopyranosyl-14β,21-dihydroxy - 20 - oxo-5β-pregnane were dissolved in 30 ml. of benzene. While stirring and exteriorly cooling the resulting solution with ice, first a solution of 4 gm. (16.8 millimols) of 2-diethylphosphono-2-fluoroacetic acid in 10 ml. of benzene and then a solution of 4 gm. (19.4 millimols) of dicyclohexyl carbodiimide in 10 ml. of benzene were added thereto, and the resulting mixture was stirred for one hour at room temperature. Thereafter, the precipitated N,N-dicyclohexylurea was filtered off, and the benzene was distilled out of the filtrate in vacuo, leaving the desired pregnane ester glycoside of the formula

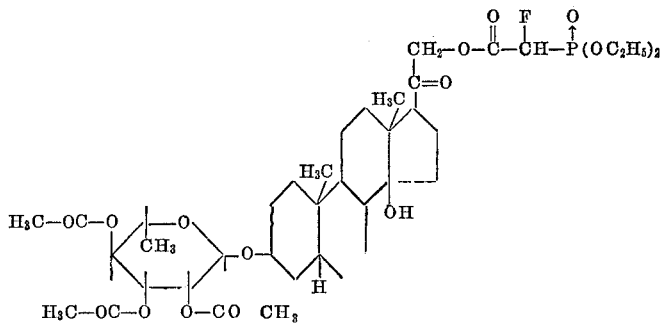

in the form of an oil having an $R_f$-value of 0.25 (silicagel; flow agent: methyl ethyl ketone:xylene=1:1).

(b) 22-fluoro-evomonoside triacetate.—The pregnane compound obtained in (a) was taken up in 80 ml. of dimethylglycol, the solution was admixed with 2.5 gm. (20 millimols) of potassium tert.-butylate, and the mixture was allowed to stand for one hour at room temperature. Thereafter, the reaction mixture was poured into 150 ml. of dilute hydrochloric acid, and the resulting acidic solution was extracted several times with chloroform. The extracts were combined, washed with water, dried and evaporated to dryness in vacuo. The residue was purified by chromatography on silicagel (particle size: 0.2–0.5 mm.; solvent system: chloroform:acetone=4:1), yielding 2 gm. (39% of theory) of 22-fluoro-evomonoside triacetate having an $R_f$-value of 0.65 (silicagel; flow agent: methyl ethyl ketone/xylene=4:1).

(c) 22-fluoro-evomonoside.—The 22-fluoro-evomonoside triacetate obtained in (b) was dissolved in 200 ml. of methanol to which 100 ml. of methanolic ammonia had been added, and the solution was stirred for 5 hours at room temperature. Thereafter, the reaction temperature was evaporated to dryness in vacuo, and the residue was recrystallized from a mixture of acetone and n-hexane (1:1), yielding 1.16 gm. (70% of theory) of the compound of the formula

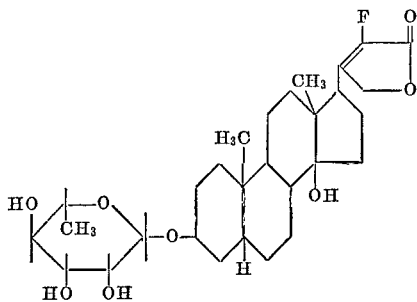

having a melting point of 227–230° C. and an $R_f$-value of 0.4 (silicagel; flow agent: methyl ethyl ketone/xylene=5:2).

EXAMPLE 2

22-fluoro-evomonoside acetonide

A solution of 1 gm. (1.85 millimols) of 22-fluoro-evomonoside in 50 ml. of acetone was admixed with 5 ml. of 2,2-dimethoxy-propane and with a solution of a catalytic amount of p-toluenesulfonic acid in a small amount of water, and the resulting mixture was stirred for 90 minutes at room temperature. Thereafter, the reaction solution was evaporated to dryness in vacuo, the residue was taken up in chloroform, the organic solution was washed with aqueous sodium bicarbonate and dried, the chloroform was evaporated in vacuo, and the residue was chromatographed on silicagel (particle size 0.2–0.5 mm.; solvent system: chloroform/acetone=12:1). 420 mgm. (39% of theory) of the compound of the formula

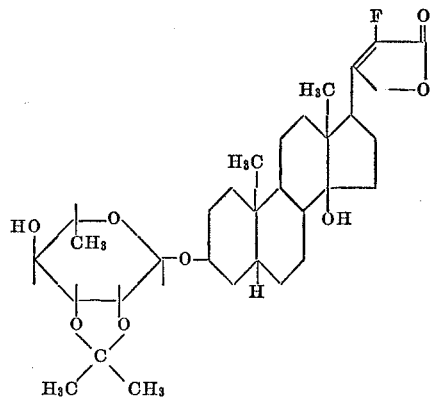

having a melting point of 125–130° C. (recrystallized from ether/n-hexane=1:1) and an $R_f$-value of 0.65 (silicagel; flow agent: methyl ethyl ketone/xylene=1:1) were obtained.

EXAMPLE 3

22-fluoro-evomonoside acetonide monoacetate

A solution of 1.1 gm. (1.9 millimols) of 22-fluoro-evomonoside acetonide in 20 ml. of pyridine was admixed with 5 ml. of acetic acid anhydride, and the mixture was stirred for 12 hours at room temperature. Thereafter, the reaction solution was evaporated to dryness in vacuo, the residue was taken up in chloroform, the organic solution was washed with aqueous sodium bicarbonate and dried, and the chloroform was evaporated in vacuo. The residue was chromatographed on silicagel (particle size 0.2–0.5 mm.; solvent system: Chloroform/acetone=1:1), yielding 0.9 gm. (75% of theory) of the compound of the formula

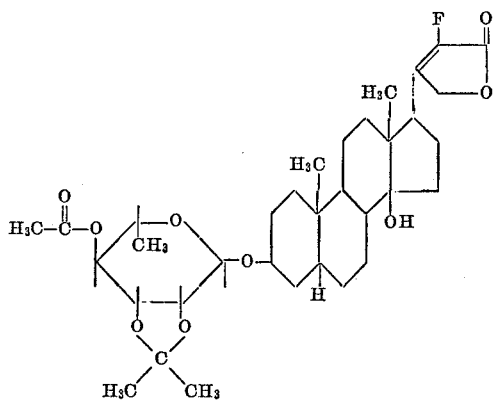

having a melting point of 225–227° C. (recrystallized from ether/n-hexane=1:1) and an $R_f$-value of 0.75 (silicagel; flow agent: methyl ethyl ketone/xylene=1:1).

EXAMPLE 4

22-fluoro-convallatoxol by method A (a) Using a procedure analogous to that described in Example 1(a), 3β - (2',3',4'-O-triacetyl)-α-L - rhamnopyranosyl - 5β,14β,19,21 - tetrahydroxy - 19 - acetyl-21-(2"-diethylphosphono - 2" - fluoroacetyl)-20-oxo-5β-pregnane of the formula

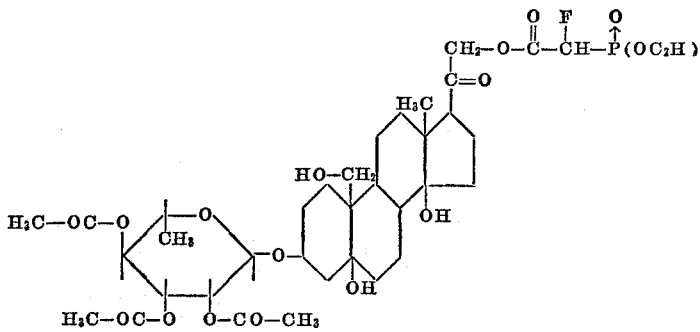

was prepared from 0.7 gm. (1 millimol) of 3β-(2',3',4'-O - triacetyl) - α - L-rhamnopyranosyl-5β,14β,19,21-tetrahydroxy - 19 - acetyl-20-oxo-5β-pregnane, 430 mgm. (2 millimols) of 2-diethylphosphono-2-fluoro-acetic acid and 413 mgm. (2 millimols) of dicyclohexyl carbodiimide. The product had an $R_f$-value of 0.35 (silicagel; flow agent: methyl ethyl ketone/xylene=1:1).

(b) Using a procedure analogous to that described in Example 1(b), the pregnane compound obtained in (a) was cyclized with 230 mgm. (2.5 millimols) of potassium tert.-butylate to yield 370 mgm. (50% of theory) of 22-fluoro-convallatoxol tetraacetate having a melting point of 150° C. (indefinite) and an $R_f$-value of 0.55 (silicagel; flow agent: methyl ethyl ketone/xylene=1:1).

(c) Using a procedure analogous to that described in Example 1(c), the tetraacetate obtained in (b) was hydrolized to 70% of theory of the compound of the formula

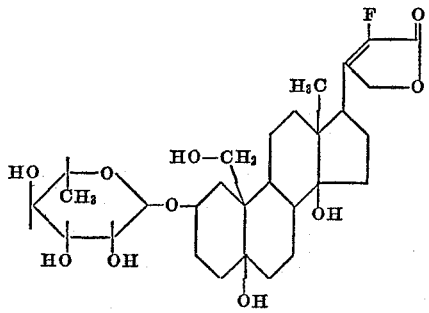

having a melting point of 90–95° C. (not crystallized) and an $R_f$-value of 0.4 (silicagel; flow agent: methyl ethyl ketone, water-saturated).

EXAMPLE 5

22-methyl-evomonoside by method A (a) Using a procedure analogous to that described in Example 1(a), 3β-(2',3',4'-O-triacetyl)-α-L-rhamnopyranosoyl - 14β,21 - dihydroxy-21-(2"-diethylphosphono-2"-methyl-acetyl)-20-oxo - 5 β - pregnane, having an $R_f$-value of 0.45 (silicagel; flow agent: methyl ethyl ketone/xylene=5:2), was prepared from 3 gm. (5.3 milimols) of 3β-(2',3',4'-O-triacetyl)-α-L-rhamnopyranosyl-14β,21-dihydroxy-20-oxo-5β-pregnane, 3 gm. (14 millimols) of 2-diethylphosphono-2-methyl-acetic acid and 3 gm. (14 millimols) of dicyclohexyl carbodiimide.

(b) Using a procedure analogous to that described in Example 1(b), 2.8 gm. of raw 22-methyl-evomonoside triacetate, having an $R_f$-value of 0.8 (silicagel, flow agent: methyl ethyl ketone/xylene=5.2), were obtained by cyclizing the pregnane compound obtained in (a) with 3.2 gm. (30 millimols) of potassium tert.-butylate.

(c) Using a procedure analogous to that described in Example 1(c), the triacetate obtained in (b) was hydrolized to yield 500 mgm. (18% theory) of the compound of the formula

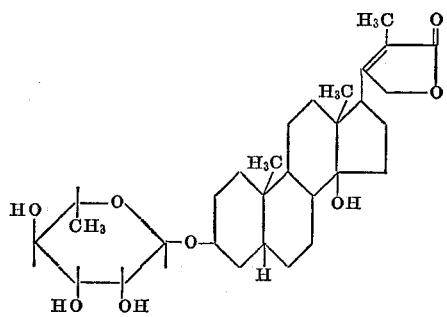

having a melting point of 215–220° C. and an $R_f$-value of 0.2 (silicagel; flow agent: methyl ethyl ketone/xylene=5:2).

EXAMPLE 6

22-methyl-evomonoside by method B (a) 22-methyl-digitoxigenin - 3 - acetate.—2 gm. (5.1 millimols) of 3β,14β,21-trihydroxy-3β-acetyl-20-oxo-5β-pregnane were dissolved in 20 ml. of benzene and, while stirring and exteriorly cooling the solution with ice, first a solution of 2 gm. (9.5 millimols) of 2-diethyl-phosphono-2-methyl-acetic acid in 10 ml. of benzene and then a solution of 2 gm. (9.8 millimols) of dicyclohexyl carbodiimide in 10 ml. of benzene were added thereto. The mixed solution was stirred for one hour at room temperature, and then the precipitated N,N'- dicyclohexylurea was filtered off, and the filtrate was evaporated to dryness in vacuo, yielding 3β,14β,21-trihydroxy-3β-acetyl-21-(2'-diethylphosphono-2'-methyl-acetyl) - 20 - oxo - 5β-pregnane having an $R_f$-value of 0.55 (silicagel; flow agent: methyl ethyl ketone/xylene=5:2).

The pregnane compound thus obtained was taken up in 40 ml. of dimethylglycol, the resulting solution was admixed with 770 mgm. (7 millimols) of potassium tert.-butylate, and the mixture was allowed to stand for one hour at room temperature. Thereafter, the reaction mixture was poured into 50 ml. of dilute hydrochloric acid, and the aqueous acidic mixture was extracted several times with chloroform. The combined extracts were washed with water until neutral, dried, evaporated to dryness in vacuo, and the residue was chromatographed on silicagel (particle size 0.2–0.5 mm.; solvent system: chloroform/acetone=4:1). 1.6 gm. (73% of theory) of 22-methyl-digitoxygenin-3-acetate, having a melting point of 190–195° C. and an $R_f$-value of 0.7 (silicagel; flow agent: methyl ethyl ketone/xylene=5:2), were obtained.

(b) 22-methyl-digitoxigenin.—The end product obtained in (a) was admixed with 15 ml. of an aqueous 10% solution of potassium carbonate and 100 ml. of methanol, and the mixture was heated for six hours at about 60° C. Thereafter, the methanol was evaporated in vacuo, the residue was taken up in chloroform, the organic phase was washed with water and dried, and the chloroform was evaporated in vacuo, yielding 900 mgm. (62% of theory) of the compound of the formula

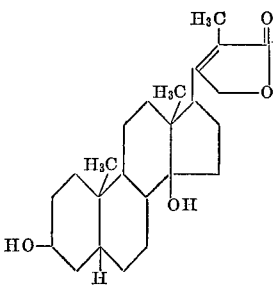

having a melting point of 258–260° C. and an $R_f$-value of 0.6 (silicagel; flow agent: methyl ethyl ketone/xylene=5:2).

(c) 22-metyhl-evomonoside.—A mixture consisting of 1.6 gm. (4 millimols) of 22-methyl-digitoxigenin, 150 ml. of absolute ethylene dichloride, 5 gm. (8 millimols) of tribenzoyl-rhamnosyl bromide and 2.3 gm. of mercury-II-cyanide was stirred for six hours at room temperature in an atmosphere of nitrogen. Thereafter, the reaction mixture was filtered, the filtrate was evaporated to dryness in vacuo, and the residue was dissolved in 300 ml. of methanol. The resulting solution was admixed with with a solution of 6 gm. of potassium carbonate in 30 ml. of water, and the mixed solution was heated at its boiling point for 5 minutes. Thereafter, the methanol was removed in vacuo, the residue was admixed with water, and the insoluble matter was separated by vacuum filtration. The filter cake was chromatographed on silicagel (particle size 0.2–0.5 mm.; solvent system: chloroform/methanol=1:1), yielding 1.6 gm. (76% of theory) of the compound of the formula

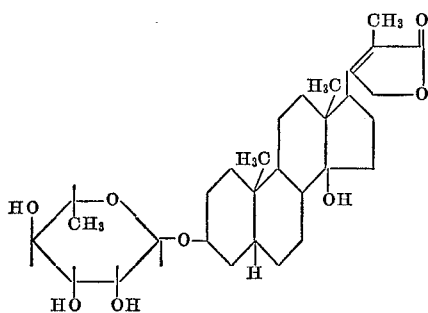

having a melting point of 215–220° C. (recrystallized from methanol/ether=1:1) and an $R_f$-value of 0.2 (silicagel; flow agent: methyl ethyl ketone/xylene=5:2).

EXAMPLE 7

Using a procedure analogous to that described in Example 2, 0.5 gm. (62% of theory) of 22-methyl-evomonoside acetonide, having a melting point of 260–262° C. and an $R_f$-value of 0.8 (silicagel; flow agent: methyl ethyl ketone/xylene=5:2), was obtained from 0.6 gm. (1.1 millimols) of 22-methyl-evomonoside and 2,2-dimethoxy-propane.

EXAMPLE 8

Using a procedure analoguous to that described in Example 3, 280 mgm. (43% of theory) of 22-methyl-evomonoside acetonide monoacetate, having a melting point of 240–243° C. and an $R_f$-value of 0.7 (silicagel; flow agent: methyl ethyl ketone/xylene=1:1), were obtained from 0.6 gm. (1.04 millimols) of 22-methyl-evomonoside acetonide.

EXAMPLE 9

22-fluoro-convallatoxin by method B (a) 22 - fluoro-k-strophanthidol-3,19-diacetate.—Using a procedure analogous to that described in Example 6(a), 3β,5β,14β,19,21 - pentahydroxy - 3,19 - diacetyl-21-(2′-diethylphosphono-2′-fluoro-acetyl)-20 - oxo - 5β - pregnane, having an $R_f$-value of 0.25 (silicagel; flow agent: methyl ethyl ketone/xylene=1:1), was prepared from 4.7 gm. (10 millimols) of 3β,5β,14β,19,21-pentahydroxy-3,19-diacetyl-20-oxo-5β-pregnane, 3 gm. (14 millimols) of 2-diethylphosphono-2-fluoro-acetic acid and 3.5 gm. (17 millimols) of dicyclohexyl carbodiimide.

The pregnane ester thus obtained was then cyclized with 1.75 gm. (17 millimols) of potassium tert.-butylate analogous to Example 6(a), yielding 1.9 gm. (38% of theory) of 22-fluoro-k-strophanthidol-3,19-diacetate, having an $R_f$-value of 0.35 (silicagel; flow agent: methyl ethyl ketone/xylene=1:1).

(b) Using a procedure analogous to that described in Example 6(b), 1.6 gm. (98% of theory) of 22-fluoro-k-strophanthidol, having an $R_f$-value of 0.4 (silicagel; flow agent: methyl ethyl ketone/xylene=5:2), were obtained by hydrolysis of 1.9 gm. of 22-fluoro-k-strophanthidol-3,19-diacetate.

(c) 22-fluoro-k-strophanthidin.—A solution of 1.6 gm. (2.8 millimols) of 22-fluoro-k-strophanthidol in 20 ml. of pyridine was admixed with a solution of 1.6 gm. (16 millimols) of chromium trioxide in 20 ml. of pyridine and 2 ml. of water, and the mixture was stirred for 2 hours at 0° C. Thereafter, the excess chromium trioxide was destroyed with methanol, water was added, and the aqueous mixture was extracted several times with a mixture of chloroform and methanol (4:1). The combined extracts were washed with aqueous sodium bisulfite and dried, and the solvent was evaporated in vacuo, yielding as the residue 0.9 gm. (56% of theory) of the compound of the formula

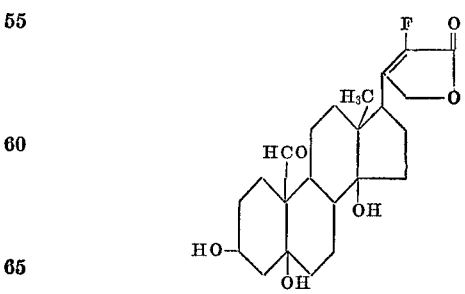

having an $R_f$-value of 0.55 (silicagel; flow agent: methyl ethyl ketone/xylene=5:2).

(d) Using a procedure analogous to that described in Example 6(c), 530 mgm. (41% of theory) of 22-fluoro-convallatoxin, M.P. 212–215° C., $R_f$-value 0.55 (silicagel, flow agent: methyl ethyl ketone, water-saturated), of the formula

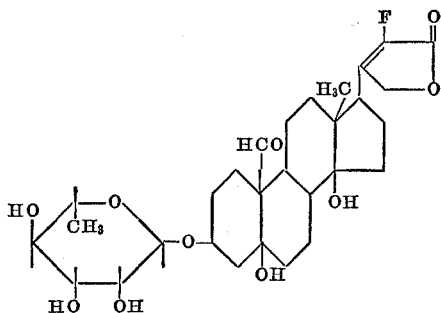

were obtained from 0.9 gm. (2.1 millimols) of 22-fluoro-k-strophanthidol and 4 gm. (11 millimols) of triacetorhamnosyl bromide.

EXAMPLE 10

Using a procedure analogous to that described in Example 2, 0.96 gm. (44% of theory) of 22-fluoro-convallatoxin-acetonide, M.P. 165–170° C., $R_f$-value 0.7 (silicagel; flow agent: methyl ethyl ketone/xylene=5:2), was obtained from 2 gm. (3.5 millimols) of 22-fluoro-convallatoxin and 2,2-dimethoxy-propane.

EXAMPLE 11

Using a procedure analogous to that described in Example 3, 0.2 gm. (30.5% of theory) of 22-fluoro-convallatoxin-acetonide-acetate, M.P. 137–143° C., $R_f$-value 0.75 (silicagel; flow agent: methyl ethyl ketone/xylene=5:2), was obtained from 0.6 gm. (1 millimol) of 22-fluoro-convallatoxin-acetonide.

EXAMPLE 12

22-methyl-convallatoxin by method B (a) using a procedure analogous to that described in Example 6(a), 3β,5β,14β,19,21-pentahydroxy-3,19-diacetyl - 21 - (2'-diethylphosphono-2'-methyl-acetyl)-20-oxo-5β-pregnane, $R_f$-value 0.25 (silicagel; flow agent: methyl ethyl ketone/xylene=5:2), was prepared from 4.7 gm. (10 millimols) of 3β,5β,14β,19,21-pentahydroxy-3,19-diacetyl-20-oxo-5β-pregnane, 3.1 gm. (15 millimols) of 2-diethylphosphono-2-methylacetic acid and 3.1 gm. (15 millimols) of dicyclohexyl carbodiimide.

The pregnane ester thus obtained was then cyclized analogous to Example 6(a) with 2.5 gm. (20 millimols) of potassium tert.-butylate, yielding 1.4 gm. (25% of theory) of 22-methyl-k-strophanthidol-3,19-diacetate, $R_f$-value 0.6 (silicagel; flow agent: methyl ethyl ketone/xylene=5:2).

(b) Using a procedure analogous to that described in Example 6(b), 3 gm. (6 millimols) of 22-methyl-k-strophanthidol-3,19-diacetate were hydrolyized, yielding 2.3 gm. (92% of theory) of 22-methyl-k-strophanthidol, $R_f$-value 0.3 (silicagel; flow agent: methyl ethyl ketone/xylene=5:2).

(c) Using a procedure analogous to that described in Example 9(c), 2.3 gm. (5.5 millimols) of 22-methyl-k-strophanthidol were oxidized, yielding 1.5 gm. (68% of theory) of 22-methyl-k-strophanthidin, $R_f$-value 0.4 (silicagel; flow agent: methyl ethyl ketone/xylene=5:2), of the formula

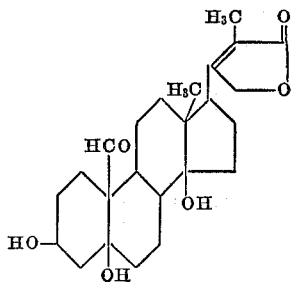

(d) Using a procedure analogous to that described in Example 9(d), 710 mgm. (51% of theory) of 22-methyl convallatoxin, M.P. 125° C. (not crystallized), $R_f$-value 0.3 (silicagel; flow agent: methyl ethyl ketone, water-saturated), of the formula

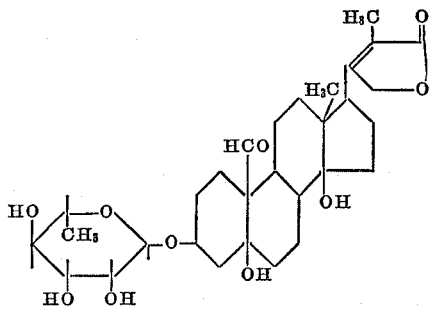

were obtained from 1.5 gm. (3.6 millimols) of 22-methyl-k-strophanthidin and 3 gm. (7.2 millimols) of triacetorhamnosyl bromide.

EXAMPLE 13

Using a procedure analogous to that described in Example 2, 634 mgm. (90% of theory) of 22-methyl-convallatoxin-acetonide, M.P. 132–136° C., $R_f$-value 0.5 (silicagel; flow agent: methyl ethyl ketone/xylene=5:2), were obtained from 650 mgm. (1.15 millimols) of 22-methyl-convallatoxin and 2,2-dimethoxy-propane.

EXAMPLE 14

Using a procedure analogous to that described in Example 3, 390 mgm. (94% of theory) of 22-methyl-convallatoxin-acetonide-acetate, M. P. 125° C., $R_f$-value 0.6 (silicagel; flow agent: methyl ethyl ketone/xylene=5:2), were obtained from 400 mgm. (0.6 millimols) of 22-methyl-convallatoxin-acetonide.

EXAMPLE 15

22-methyl-convallatoxol-acetonide

A solution of 400 mgm. (0.6 millimols) of 22-methyl-convallatoxin-acetonide and 516 mgm. (2 millimols) of lithium-tri(tert.-butoxy)-aluminum hydride in 10 ml. of tetrahydrofuran was stirred for one hour at 0° C. Thereafter, the reaction solution was neutralized with aqueous 10% acetic acid and then extracted several times with chloroform. The combined extracts were washed with saturated aqueous potassium bicarbonate and dried, and the chloroform was removed in vacuo. The residue was chromatographed on silicagel (particle size 0.2–0.5 mm.; solvent system: chloroform/acetone=5:1 to 1:1), yielding 76 mgm. (69% of theory) of the compound of the formula

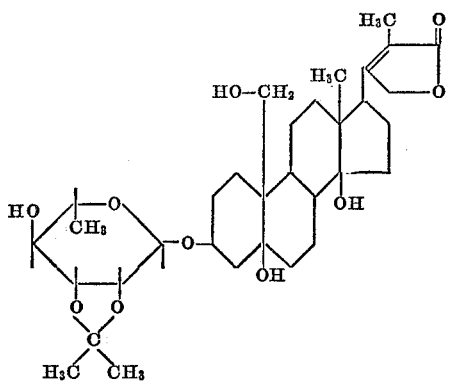

having a melting point of 108–113° C. and an $R_f$-value of 0.25 (silicagel; flow agent: methyl ethyl ketone/xylene=5:2).

The compounds according to the present invention, that is, those embraced by Formulas I, II and III above, have useful properties. More particularly, the compounds of the Formula I exhibit effective cardiotonic activities with positive inotropic action in warm-blooded animals, such as cats, guinea pigs and rats; their cardiotonic activities were ascertained by the standard test methods of Hatcher, Amer. J. Pharmacy 82, 360 (1910), on cats, and Knaffl-Lenz, Arch. exp. Path. u. Pharmakol. 135, 259 (1928), on guinea pigs; their resorption rate was determined by the method of Granwiler, Schweizer Med. Wochenschrift 41, 1381 (1966), on rats.

The compounds of the Formulas II and III are useful as intermediates in the preparation of compounds of the Formula I.

For pharmaceutical purposes the compounds of the Formula I are administered to warm-blooded animals perorally or parenterally as active ingredients in customary dosage unit compositions, that is compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds of the Formula 1 is from 0.002 to 0.034 mgm./kg. body weight.

The following examples illustrate a few dosage unit compositions comprising a compound of the Formula I as an active ingredient and represent the best modes contemplated of putting the invention into practical use. The parts are parts by weight unless otherwise specified.

EXAMPLE 16

Tablets

The tablet composition is compounded from the following ingredients:

| | Parts |
|---|---|
| 22-methyl-evomonoside | 0.25 |
| Lactose | 85.75 |
| Potato starch | 30.00 |
| Gelatin | 3.00 |
| Magnesium stearate | 1.00 |
| Total | 120.00 |

Preparation.—The evomonoside is thoroughly ground with ten times its weight of lactose, the ground mixture is admixed with the remaining amount of lactose and with the potato starch, the resulting mixture is moistened with an aqueous 10% solution of the gelatin, the moist mass is forced through a 1.5 mm.-mesh screen, and the resulting granulate is dried at 40° C., again passed through a 1 mm.-mesh screen, and admixed with the magnesium stearate. The finished composition is compressed into 120 mgm.-tablets. Each tablet contains 0.25 mgm. of evomonoside and is an effective oral cardiotonic composition with positive inotropic action.

EXAMPLE 17

Coated pills

The pill core compsition is compounded from the following ingredients:

| | Parts |
|---|---|
| 22-fluoro-evomonoside | 0.25 |
| Lactose | 32.25 |
| Corn starch | 15.00 |
| Polyvinylpyrrolidone | 2.00 |
| Magnesium stearate | 0.50 |
| Total | 50.00 |

Preparation.—The evomonoside is thoroughly ground with ten times its weight of lactose, the ground mixture is admixed with the remaining amount of lactose and with the corn starch, the resulting mixture is moistened with an aqueous 15% solution of the polyvinylpyrrolidone, the moist mass is forced through a 1 mm.-mesh screen, the resulting granulate is dried at 40° C., again passed through the screen and admixed with the magnesium stearate, and the finished composition is compressed into 50 mgm.-pill cores, which are then coated with a thin shell consisting essentially of talcum and sugar and finally polished with beeswax. Each coated pill contains 0.25 mgm. of the evomonoside and is an effective oral cardiotonic composition with positive inotropic activity.

EXAMPLE 18

Drop solution

The solution is compounded from the following ingredients:

| | Parts |
|---|---|
| 22-fluoro-evomonoside | 0.0125 |
| Saccharin-sodium | 0.3 |
| Sorbic acid | 0.1 |
| Ethanol | 30.0 |
| Flavoring | 1.0 |
| Distilled water, q.s. ad | 100.0 |

Preparation.—The evomonoside and the flavoring are dissolved in the ethanol; the sorbic acid and the saccharin are dissolved in the distilled water. The two solutions admixed with each other and filtered until free from suspended matter. 1 ml. (20 drops) of the filtrate contains 0.125 mgm. of the evomonoside and is an effective oral cardiotonic composition with positive inotropic action.

EXAMPLE 19

Hypodermic solution

The solution is compounded from the following ingredients:

| | Parts |
|---|---|
| 22-methyl-evomonoside | 0.25 |
| Polyethyleneglycol 600 | 150.00 |
| Tartaric acid | 5.0 |

Distilled water, q.s. ad, parts by vol. 3000.0.

Preparation.—The tartaric acid, the polyethyleneglycol and the evomonoside are successively dissolved in a sufficient amount of distilled water, and the resulting solution is diluted with distilled water to the indicated volume and then filtered until free from suspended matter. The filtrate is filled into white 3 ml.-ampules which are then sealed and sterilized for 20 minutes at 120° C. Each ampule contains 0.25 mgm. of the evomonoside, and the contents thereof are an effective intravenous cardiotonic composition with positive inotropic action.

EXAMPLE 20

The suppository composition is compounded from the following ingredients:

| | Parts |
|---|---|
| 22-fluoro-evomonoside | 0.25 |
| Lactose | 4.75 |
| Cocoa butter | 1695.00 |
| Total | 1700.00 |

Preparation.—The evomonoside and the lactose are admixed, the mixture is thoroughly ground, and the ground mixture is blended with an immersion homogenizer into the cocoa butter, which had previously been melted and cooled to 40° C. The homogeneous composition is cooled to 37° C., and 1700 mgm. portions thereof are poured into cooled suppository molds. Each suppository contains 0.25 mgm. of the evomonoside and is an effective rectal cardiotonic composition with positive inotropic action.

Analogous results are obtained when any one of the other cardenolide-rhamnosides embraced by Formula I is substituted for the particular evomonoside in Example 16 through 20. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

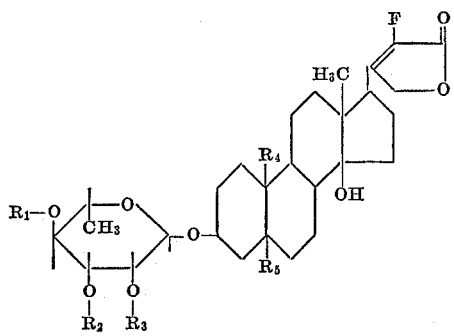

wherein $R_1$ is hydrogen or acetyl,
$R_2$ and $R_3$ are each hydrogen or acetyl or, together with each other O-isopropylidene.
$R_5$ is hydrogen or hydroxyl, and
$R_4$ is methyl when $R_5$ is hydrogen; or formyl or hydroxymethyl when $R_5$ is hydroxyl.

2. The compound of claim 1, which is 22-fluoro-evomonoside.

3. The compound of claim 1, which is 22-fluoro evomonoside acetonide.

4. The compound of claim 1, which is 22-fluoro-convallatoxin.

5. A compound of the formula

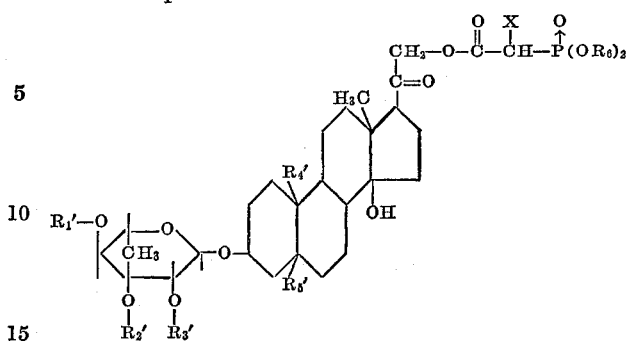

wherein

X is fluorine or methyl,
$R_6$ is lower alkyl,
$R_1'$, $R_2'$ and $R_3'$ are each acetyl or benzoyl,
$R_5'$ is hydrogen or hydroxyl, and
$R_4'$ is methyl when $R_5'$ is hydrogen; or acetoxy-methyl when $R_5'$ is hydroxyl.

References Cited

UNITED STATES PATENTS 3,458,628    7/1969    Kaiser _____ 260—210.5

OTHER REFERENCES

Kovalev et al., "Chem. Abst.," vol 63, 1965, p. 5727g.
Kulshreshtha, et al.: "Chem. Abst." vol. 72, 1970, p. 35725d.

LEWIS GOTTS, Primary Examiner

J. R. BROWN, Assistant Examiner

U.S. Cl. X.R.

260—239.57; 424—182